(12) United States Patent
Colin

(10) Patent No.: US 6,197,376 B1
(45) Date of Patent: Mar. 6, 2001

(54) PROCESS AND INSTALLATION FOR COVERING A SURFACE OF A SUBSTRATE WITH A LAYER OF A FLUID MATERIAL

(75) Inventor: Bruno Colin, March l'Etoile (FR)

(73) Assignee: Bio Merieux, Marcy l'Etoile (FR)

( * ) Notice: Subject to any disclaimer, the term of this patent is extended or adjusted under 35 U.S.C. 154(b) by 0 days.

(21) Appl. No.: 09/319,504

(22) PCT Filed: Dec. 30, 1997

(86) PCT No.: PCT/IB97/01608

§ 371 Date: Jul. 19, 1999

§ 102(e) Date: Jul. 19, 1999

(87) PCT Pub. No.: WO98/29194

PCT Pub. Date: Jul. 9, 1998

(30) Foreign Application Priority Data

Dec. 30, 1996 (FR) .................................................. 96 16377

(51) Int. Cl.⁷ .................................. B05D 1/02; B05B 1/28
(52) U.S. Cl. ......................... 427/294; 427/345; 427/421; 118/50; 118/326; 118/603; 239/104; 239/120; 239/124; 239/424
(58) Field of Search .................................... 427/294, 345, 427/421; 118/603, 326, 50, 124, 424; 239/104, 120, 124, 424

(56) References Cited

U.S. PATENT DOCUMENTS 2,488,195   11/1949   Ivey .

4,788,739   12/1988   Brewer et al. ......................... 15/322

FOREIGN PATENT DOCUMENTS

| 1134069 | 11/1968 | (GB) . |
| WO 79/00469 | 7/1979 | (WO) . |
| WO 92/12803 | 8/1992 | (WO) . |
| WO 96/09122 | 3/1996 | (WO) . |

Primary Examiner—Katherine A. Bareford
(74) Attorney, Agent, or Firm—Oliff & Berridge, PLC

(57) ABSTRACT

Process for covering a surface (1a) of a substrate (1) with a layer (2) of a fluid material, characterized in that: (a) with a confining wall (3) closed up on itself, arranged some distance from and above the surface to be covered (1a), and whose lower edge (3a) forms together with the latter a peripheral void (4), is defined a treatment chamber (5) delimiting an area (6) to be treated on the said surface to be covered; (b) a controlled vacuum is established inside the treatment chamber (5) by admitting an incoming gas stream (7) via the peripheral void (4), and by extracting an outgoing gas stream (8) from the treatment chamber, so as to obtain an internal pressure in the said chamber which is lower than the external pressure; (c) a controlled fluid stream (10) is introduced into the treatment chamber (5) under vacuum, this stream comprising the fluid covering material, which forms at the level of the peripheral void, together with the incoming gas stream (7), a turbulent mixed flow, which is aspirated into contact with the developed surface (1b) in the area (6) to be treated, depositing the fluid material thereat, and which is then discharged with the outgoing gas stream (8).

7 Claims, 1 Drawing Sheet

PROCESS AND INSTALLATION FOR COVERING A SURFACE OF A SUBSTRATE WITH A LAYER OF A FLUID MATERIAL

This is a National Stage Application of PCT/IB97/01608 filed Dec. 30, 1997.

The present invention relates to the covering of a surface of a substrate with a layer of a fluid material, or the depositing on the said surface of a continuous layer of the said fluid material.

BACKGROUND OF THE INVENTION

Various solutions have already been proposed in the prior art, for covering a surface of a substrate, in relative motion or otherwise, with a fluid material (liquid or powder for example).

All the proposed solutions have in common on the one hand the prior formation, by overpressure or under vacuum, of a turbulent mixed flow obtained by mixing, with entrainment if necessary, of a controlled fluid stream comprising the fluid covering material, and of a gas stream, and on the other hand various arrangements making it possible to recover the unused or unconsumed turbulent mixed flow so as to avoid its diffusion into the ambient air.

In accordance with document WO-92/12803, and in particular according to the embodiment described with reference to FIGS. 22 to 24, and from line 11 of page 27 to line 33 of page 29, there is described an installation for covering the surface of a substrate 643 with a fluid material.

This installation comprises a means of treatment comprising a confining wall 657, with an edge defining the area to be treated. A means 666 makes it possible to establish a controlled vacuum inside the area to be treated, by admitting several incoming gas streams 684 and 680, through the aforesaid void. A means of controlled introduction, or head 642, into the area to be treated of the fluid material 644, associates a controlled flow void with a pressurized air inlet 645/446, so that a turbulent mixed flow 682/683, circulating in contact with the substrate 643, is produced directly at the head outlet; cf. page 27, lines 14 to 21.

The incoming air streams 684 and 680 are all formed only so as to contain the turbulent mixed flow in the area to be treated; cf. for example page 29, lines 1 to 4, and lines 25 to 30.

In accordance with document WO-79/00469, a turbulent mixed flow is obtained by previously mixing a controlled fluid stream (3) comprising the fluid covering material, and a gas stream, these two streams being under overpressure so as to eject the mixed flow through a distribution vessel (5). Two successive confining walls of cylindrical shape form two concentric peripheral volumes 6 and 7, under vacuum, so as to discharge the turbulent mixed flow after its contact with the surface to be covered.

In accordance with document GB-1 134 069, a turbulent mixed flow is obtained, under vacuum, by mixing a fluid stream (powder) and a gas stream. The turbulent mixed flow resulting from this circulates as a co-current, still under vacuum, in contact with the surface of an elongate substrate moving translationally.

In accordance with document WO-96/09122, a nozzle for spraying a powder is described, making it possible to eject under pressure a turbulent mixed flow obtained previously by mixing a fluid stream (powder) and a gas stream. The unused mixed flow is reaspirated around the nozzle by appropriate means.

At the conclusion of this examination, all the prior solutions have the common characteristic of pushing as it were the fluid material onto the surface of the substrate to be covered. This characteristic may prove to be inefficient for covering substrates with an irregular surface, for example a porous surface.

SUMMARY OF THE INVENTION

In accordance with the present invention, consideration is therefore given to any substrate or support, whose apparent surface area is smaller in value than the actual or developed surface area of the same substrate, by reason of the presence of asperities, bumps, or surface pores, generating a larger developed surface area than the apparent area, that is to say that visible to the naked eye.

The subject of the present invention is a process and an installation for covering a surface such as defined above, and doing so by attracting as it were the fluid covering material towards and into the entire surface of the substrate.

The process in accordance with the present invention associates in cooperation the following steps:

(a) with a confining wall closed up on itself, arranged some distance from and above the surface to be covered, and whose lower edge forms together with the latter a peripheral void, a treatment chamber delimiting on the surface to be covered an area to be treated is defined or made available (b) a controlled vacuum is established inside the treatment chamber by admitting an incoming gas stream via the peripheral void, and by extracting an outgoing gas stream from the treatment chamber, so as to obtain in the said chamber an internal pressure which is lower than the external pressure, that is to say outside the same chamber (c) a controlled fluid stream is introduced into the treatment chamber under vacuum, this stream comprising the fluid covering material, which forms at the level of the peripheral void, together with the incoming gas stream, a turbulent mixed flow, which is aspirated into contact with the developed surface in the area to be treated, depositing the fluid material in the latter; then this mixed flow is discharged with the outgoing gas stream.

An installation for implementing the process described above comprises, in a general manner:

a means of treatment, comprising a confining wall closed up on itself, designed so as to be arranged some distance from and above the surface to be covered, with a lower edge adapted or designed so as to form together with the said surface to be covered a peripheral void; this confining wall defines a treatment chamber delimiting an area to be treated on the said surface to be covered means for establishing a controlled vacuum inside the treatment chamber by admitting an incoming gas stream through the peripheral void, and by extracting an outgoing gas stream from the treatment chamber, so as to obtain an internal pressure in the said chamber which is lower than the external pressure, that is to say outside the said chamber a means of controlled introduction into the treatment chamber, under vacuum, of a fluid stream comprising the fluid covering material, so as to form, at the level of the peripheral void, with the incoming gas stream a turbulent mixed flow, which is aspirated into contact with the entire developed surface in the area to be treated, depositing the fluid material thereat; this mixed flow is then discharged with the outgoing gas stream.

The term "fluid material" should be understood to mean any product, substance or material, in the liquid, fluid or viscous state, which can be dispersed by the incoming gas stream in the treatment chamber, so as to form with the latter a turbulent, mixed flow, that is to say one composed of particles of the said fluid material in suspension in this incoming gas stream, doing so under the predetermined conditions, especially of temperature, adopted for treating the surface to be covered with the said fluid material. As an example of a fluid material of this kind may be cited any paint, comprising pigments or dyes in suspension or solution in an appropriate liquid medium, or else any material in the substantially solid or solid state under the normal or ambient conditions of temperature, but liquid or liquefied at the temperature for treating the surface, the covering obtained subsequently solidifying on the surface of the substrate; in this latter case may be cited for example any heavy hydrocarbon, for example a paraffin.

The term "fluid stream" should be understood to mean any liquid, fluid, viscous or pasty flow or stream which can be dispersed by the incoming gas stream in the treatment chamber, under the conditions, especially of temperature, adopted or predetermined for the operation of the treatment chamber.

By virtue of the process and the installation according to the present invention, the treatment or covering of the surface of the treated substrate is performed as close as possible to the latter, without spraying the fluid material adopted for coating the said surface to the outside or towards the outside.

The invention as defined above is distinguished from each document introduced earlier by way of prior art through the existence of a peripheral void defined between the lower edge of the confining wall and the surface to be covered, at the level of which the controlled stream (fluid covering material) is introduced into the incoming gas stream through the said void, and consequently at the level of which the turbulent mixed flow necessary for covering the said surface is obtained.

This fundamental difference makes it possible to supply the fluid covering material in a dynamic manner and as close as possible to the surface to be covered.

BRIEF DESCRIPTION OF THE DRAWINGS

The present invention is now described with reference to the appended drawing in which.

DETAILED DESCRIPTION OF THE PREFERRED EMBODIMENTS

Figure 1:
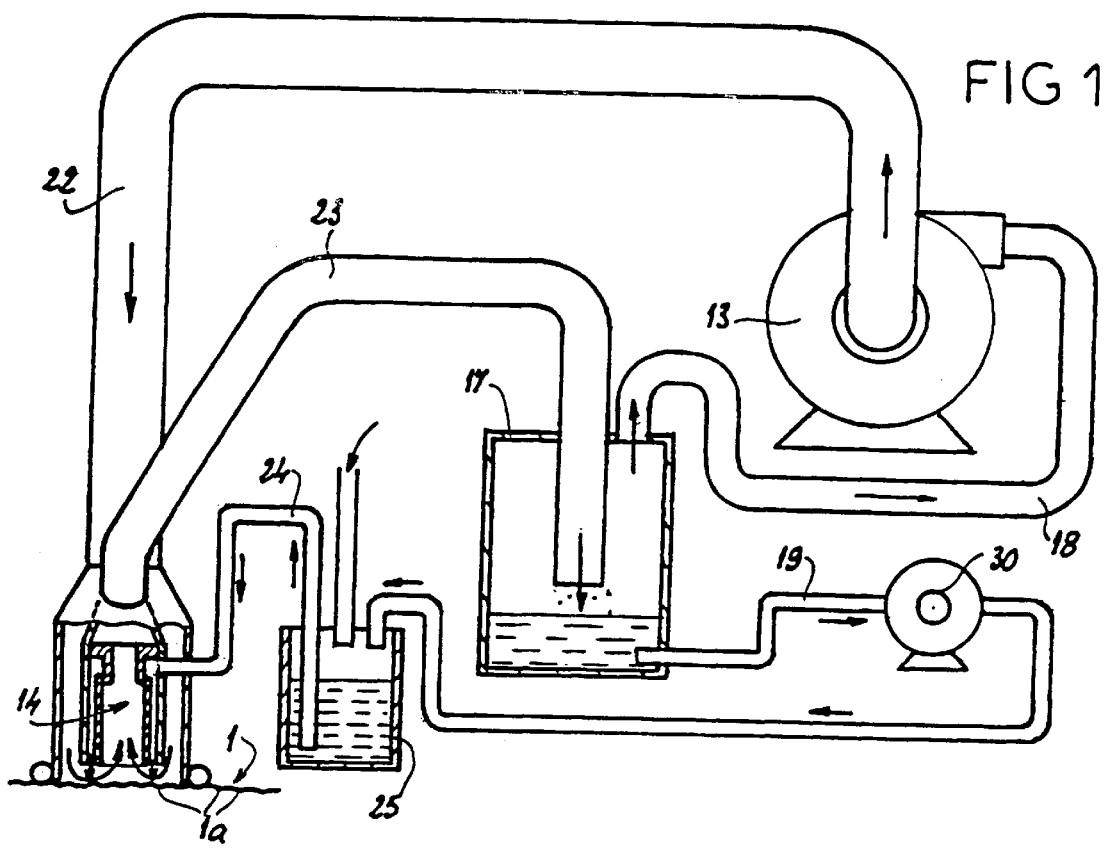
FIG. 1 represents, diagrammatically, an installation in accordance with the present invention.

An installation according to the invention comprises in a general manner:

a treatment means or head 14, which can move with respect to the surface 1a of the substrate 1 to be covered or coated, and is designed to be manipulated by the user; this means comprises principally a confining wall 3, closed up on itself, having for example symmetry of revolution, defining a treatment chamber 5 which delimits in opposite relation thereto an area 6 to be treated of the surface to be covered 1a means 13 for establishing a controlled vacuum inside the treatment chamber 5 a means 16 of controlled introduction into the treatment chamber, under vacuum, of a fluid stream 10 comprising the fluid covering material a means of separation 17 making it possible to obtain a gas stream 18 and a fluid stream 19 a means 30 of recycling the fluid stream towards the means 16 of controlled introduction and another means of recycling the gas stream 18, identical to the means 13 of controlled vacuum.

Figure 2:
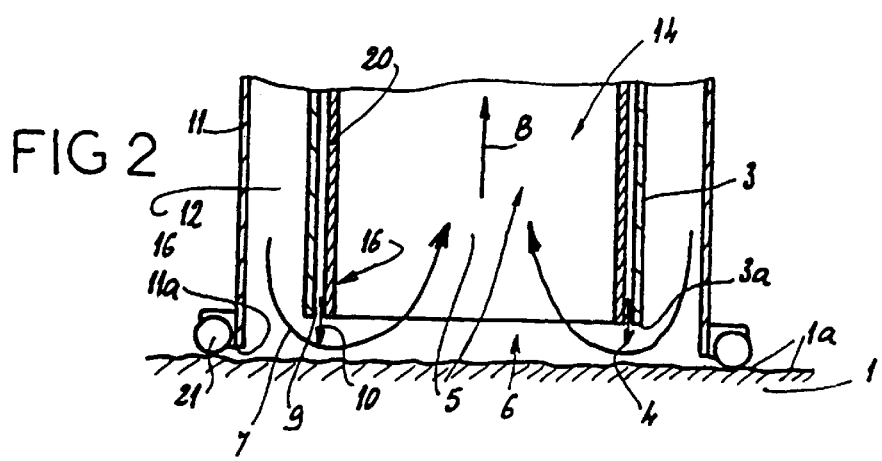
FIG. 2 represents, still diagrammatically, a treatment means or head, belonging to the installation represented in FIG. 1

The treatment means or head 14, more particularly represented in FIG. 2, exhibits in general a symmetry of revolution about an axis, and generally has the shape of a bell for example. This means 14 comprises, from the outside to the inside, an external wall 11, closed up on itself, a confining wall 3, likewise closed up on itself, separated from the external wall, and delimiting with the latter an annular passage 12, and an internal wall 20, arranged some distance from the confining wall 3, but sufficiently near to the latter to form a cylindrical capillary channel, terminating in a calibrated orifice 9, thus forming a means of controlled introduction 16, under the control of the pressure difference existing between the upstream and the downstream of the said orifice. The treatment chamber 5 is delimited inside the confining wall 3, and more exactly inside the internal wall 20. By construction, the lower edge 11a of the external wall 11 lies below the lower edge 3a of the confining wall 3, so that a peripheral void 4 is formed between the lower edge 3a and the surface 1a of the substrate to be treated, during the implementation or use of the means of treatment or head 14. The lower edge 11a of the external wall 11 is equipped with rolling means 21, such as rollers, thereby making it possible to ensure frictionless movement of the treatment head or means 14, over the whole surface 1a of the substrate 1. These rollers are arranged in such a way as to form, between the lower edge 11a and the surface 1a to be covered, a passage for the leakage of ambient air to the inside of the treatment head 14.

This treatment means or head 14 is linked to the other components of the installation, as follows:

the annular passage 12 communicates via a pipe 22 with the output of the means 13 of controlled vacuum, or pump, which recycles the gas stream 18 obtained at the outlet of the means of separation 17 to the annular passage 12, to constitute the incoming gas stream 7, passing in a calibrated manner into the peripheral void 4 via a pipe 23, passing in a sealed manner into the pipe 22, the outlet of the treatment chamber 5 communicates with the inlet of the means of separation 17, for discharging the outgoing gas stream 8 from the said chamber the capillary cylindrical channel, terminating in the calibrated orifice 9, communicates via a pipe 24 with an intermediate reserve 25 of fluid material, itself linked to the output of a pump 30.

The means 13, or pump, makes it possible to ensure the recycling of the gas stream 18 exiting the means of separation 17, in the guise of a gas stream 7 entering the treatment chamber 5. Also, this same means 13, by aspiration of the pump, makes it possible to establish a controlled vacuum inside the chamber 5, by way of the means of separation 17. This controlled vacuum is the result, on one side of the gas stream 7 entering in a controlled manner through the peripheral void 4, and of the outgoing gas stream 8 extracted from the treatment chamber 5 via the pipe 23, the whole so as to obtain in the chamber 5 an internal pressure which is lower than the external pressure, that is to say than that prevailing in the annular passage 12.

The means of controlled introduction 16 is identified with the calibrated orifice 9, allowing through the fluid stream 10, when the difference in pressure between the upstream and the downstream of this orifice is greater than the loss of head of the latter in relation to the same fluid stream 10. During operation, the means of controlled introduction is therefore under the control of the vacuum prevailing in the chamber 5, and consequently of the internal pressure in the latter, in conjunction with the external pressure in the annular passage 12.

The means of separation of tank 17 is linked by the pipe 23 to the outlet of the treatment chamber 5. This means makes it possible to separate the mixed flow gathered, on the one hand into a fluid stream 19 recycled by the pump 30 to the intermediate storage container 25, and on the other hand into a gas stream 18 recycled by the pump 13 to the annular passage 12 of the means of treatment or head 14.

During operation, the means of treatment or head 14 is arranged above but nevertheless some distance from the surface 1a of the substrate 1 to be covered, and defines an area 6 of the latter to be treated, which moves around the entire surface of the substrate, as a function of the manual displacement for example of the means of treatment or head 14.

By starting the pump 13 a controlled vacuum is established inside the treatment chamber 5 so that an internal pressure which is lower than the external pressure in the annular passage 12 is established in the said chamber.

Under the effect of the vacuum existing in the chamber 5 a controlled fluid stream 10 is introduced, at the level of the peripheral void 4, into the treatment chamber 5. This fluid stream 10 comprises the fluid covering material, and forms together with the incoming gas stream 7 a turbulent mixed flow which is aspirated into contact with the developed surface 1b in the area 6 to be treated (cf. FIG. 3). It is this turbulent mixed flow which deposits the fluid material in all the asperities, bumps and pores of the surface of the substrate 1, and then this mixed flow is discharged from the chamber 5 with the outgoing gas stream 8.

The residual turbulent mixed flow introduced into the means of separation 17 is separated into a liquid stream recycled to the intermediate container 25 and a gas stream 18 recycled by the pump 13 to the annular passage 12 of the means of treatment or head 14.

Figure 3:
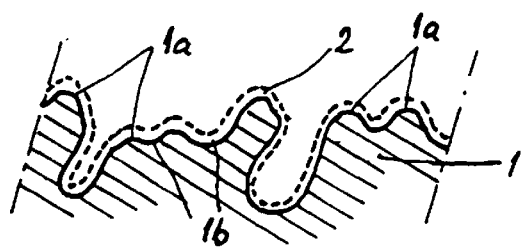
FIG. 3 represents, on an enlarged scale, a substrate, such as treated or covered according to the invention.

In total, uniform, even and continuous coverage 2 is obtained over the entire developed surface 1b of the substrate 1, as shown in FIG. 3.

What is claimed is:

1. Process for covering a surface (1a) of a substrate (1) with a layer (2) of a fluid material, according to which:
   (a) with a confining wall (3) closed up on itself, arranged some distance from and above the surface to be covered (1a), and whose lower edge (3a) forms together with the latter a peripheral void (4), is defined a treatment chamber (5) delimiting an area (6) to be treated on the said surface to be covered
   (b) a controlled vacuum is established inside the treatment chamber (5) by admitting an incoming gas stream (7) via the peripheral void (4), and by extracting an outgoing gas stream (8) from the treatment chamber, so as to obtain an internal pressure in the said chamber which is lower than the external pressure
   (c) a turbulent mixed flow between a fluid stream (10), comprising the fluid covering material, and a gas stream, is formed in the treatment chamber (5) under vacuum, the said turbulent mixed flow coming into contact with the developed surface (1b) in the area (6) to be treated, depositing the fluid material thereat, and then being discharged with the outgoing gas stream (8)
   characterized in that the fluid stream (10) is introduced in a controlled manner at the level of the peripheral void (4), between the lower edge (3a) of the confining wall (3) and the surface to be covered (1a), the said controlled fluid stream forming, together with the gas stream (7) entering via the said void, the turbulent mixed flow, which is aspirated into contact with the developed surface (1b) in the area (6) to be treated.

2. Process according to claim 1, characterized in that the fluid stream (10) introduced (7) into the treatment chamber (5) is controlled by a calibrated orifice (9), allowing through the said fluid stream when the difference in pressure between the upstream and the downstream of the said orifice is greater than the loss of head of the said orifice in relation to the said fluid stream.

3. Process according to claim 1, characterized in that, with another external wall (11), closed up on itself, separated from the confining wall (3), a passage (12) for the incoming gas stream (7) is delimited with this latter wall through the peripheral void (4) between the lower edge (3a) of the confining wall (3) and the surface to be covered (1a).

4. Installation for covering the surface (1a) of a substrate (1) with a layer (2) of a fluid material, comprising:
   a means (14) of treatment, comprising a confining wall (3) closed up on itself, designed so as to be arranged some distance from and above the surface to be covered (1a), with a lower edge (3a) adapted so as to form together with the latter a peripheral void (4), the said confining wall defining a treatment chamber (5) delimiting an area (6) to be treated on the said surface to be covered
   a means (13) for establishing a controlled vacuum inside the treatment chamber (5) by admitting an incoming gas stream (7) through the peripheral void (4), and by extracting an outgoing gas stream (8) from the treatment chamber, so as to obtain an internal pressure in the said chamber which is lower than the external pressure
   a means of forming, in the treatment chamber (5) under vacuum, a turbulent mixed flow between a fluid stream (10), comprising the fluid covering material, and a gas stream, the said turbulent mixed flow coming into contact with the developed surface (1b) in the area (6) to be treated, depositing the fluid material thereat, and then being discharged with the outgoing stream (8)
   characterized in that the means of forming the turbulent mixed flow is a means of controlled introduction (16) of the fluid stream (10), arranged at the level of the peripheral void (4) between the lower edge (3a) of the confining wall (3) and the surface to be covered (1a), the said controlled fluid stream forming, together with the gas stream entering by the said void, the turbulent mixed flow, which is aspirated into contact with the developed surface (1b) in the area (6) to be treated.

5. Installation according to claim 4, characterized in that the means of controlled introduction (16) of the fluid stream comprise a calibrated orifice (9), allowing through the fluid stream when the difference in pressure between the upstream and the downstream of the said orifice is greater than the loss of head of the said orifice in relation to the said fluid stream.

6. Installation according to claim 4, characterized in that the means of treatment (14) comprises another wall (11), external, closed up on itself, separated from the confining wall (3), delimiting with the latter a passage (12) for the incoming gas stream through the peripheral void (4) between the lower edge (3a) of the confining wall (3) the surface to be covered (1a).

7. Installation according to claim 4, characterized in that it comprises:
- a means (17) of separating the mixed flow into a gas stream (18) and a fluid stream (19)
- a means (30) of recycling the fluid stream towards the means of controlled introduction (16)
- another means of recycling (13) the gas stream (18) in the form of an incoming gas stream (7), the said means of recycling the gas stream also being the means of providing the controlled vacuum.

* * * * *